(12) United States Patent
Kim et al.

(10) Patent No.: US 11,799,338 B2
(45) Date of Patent: Oct. 24, 2023

(54) MOTOR

(71) Applicant: LG INNOTEK CO., LTD., Seoul (KR)

(72) Inventors: Seong Jin Kim, Seoul (KR); Gi Chang Moon, Seoul (KR); Jin Su Pyeon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 247 days.

(21) Appl. No.: 17/270,771

(22) PCT Filed: Aug. 27, 2019

(86) PCT No.: PCT/KR2019/010883
§ 371 (c)(1),
(2) Date: Feb. 23, 2021

(87) PCT Pub. No.: WO2020/045937
PCT Pub. Date: Mar. 5, 2020

(65) Prior Publication Data
US 2021/0336493 A1 Oct. 28, 2021

(30) Foreign Application Priority Data
Aug. 30, 2018 (KR) .......................... 10-2018-0102692

(51) Int. Cl.
*H02K 1/27* (2022.01)
*H02K 1/14* (2006.01)
(Continued)

(52) U.S. Cl.
CPC ............. *H02K 1/278* (2013.01); *H02K 1/148* (2013.01); *H02K 21/16* (2013.01); *B62D 5/0463* (2013.01); *H02K 29/03* (2013.01)

(58) Field of Classification Search
CPC ........ H02K 1/148; H02K 1/278; H02K 21/16; H02K 29/03; H02K 15/022;
(Continued)

(56) References Cited

U.S. PATENT DOCUMENTS

2012/0256514 A1* 10/2012 Junak .................... H02K 1/146
310/216.092
2016/0329783 A1 11/2016 Nagai et al.
2018/0034336 A1 2/2018 Mori et al.

FOREIGN PATENT DOCUMENTS

JP 2003-274582 A 9/2003
JP 2004-266913 A 9/2004
(Continued)

OTHER PUBLICATIONS

Supplementary European Search Report dated Sep. 24, 2021 in European Application No. 19855533.6.
(Continued)

*Primary Examiner* — Thomas Truong
(74) *Attorney, Agent, or Firm* — Saliwanchik, Lloyd & Eisenschenk

(57) ABSTRACT

An embodiment relates to a motor comprising: a shaft; a rotor engaged with the shaft; and a stator disposed outside the rotor, wherein the stator includes a stator core formed by stacking a plurality of sheets and a coil wound around the stator core, the stator core including a yoke having a hole formed therein, a tooth protruding radially from the yoke, and an adhesive member disposed in the hole, the hole being disposed on an imaginary line L extending radially along the side of the tooth. Accordingly, the motor can form a stator core by stacking sheets, and reduce noise and vibration by filling an adhesive member in a hole formed in the stator core.

13 Claims, 16 Drawing Sheets

(51) Int. Cl.
*H02K 1/278* (2022.01)
*H02K 21/16* (2006.01)
*B62D 5/04* (2006.01)
*H02K 29/03* (2006.01)

(58) Field of Classification Search
CPC ...... H02K 2213/03; H02K 1/14; H02K 1/274; H02K 15/02; B62D 5/0463
See application file for complete search history.

(56) References Cited

FOREIGN PATENT DOCUMENTS

| | | | |
|---|---|---|---|
| JP | 2012-120299 A | | 6/2012 |
| JP | 2012120299 A | * | 6/2012 |
| JP | 2013-059262 A | | 3/2013 |
| JP | 2016-005301 A | | 1/2016 |
| JP | 2016-77054 A | | 5/2016 |
| JP | 2016-171652 A | | 9/2016 |

OTHER PUBLICATIONS

International Search Report dated Dec. 6, 2019 in International Application No. PCT/KR2019/010883.
Office Action dated Jul. 4, 2023 in Japanese Application No. 2021-510307.
Office Action dated Aug. 30, 2023 in Korean Application No. 10-2018-0102692.

* cited by examiner

| Performance Item | COMPARATIVE EXAMPLE | H(Ø1.0) | Ratio[%] | H(Ø1.5) | Ratio[%] | H(Ø2.0) | Ratio[%] |
|---|---|---|---|---|---|---|---|
| ① Torque[Nm] | 4.959 | 4.956 | 0.06 ↓ | 4.939 | 0.40 ↓ | 4.873 | 1.73 ↓ |
| ② Ripple[mNm] | 114.97 | 116.50 | 1.33 ↑ | 119.20 | 3.68 ↑ | 136.25 | 18.51 ↑ |
| ③ Cogging Torque[mNm] | 29.5 | 30.0 | 1.69 ↑ | 30.0 | 1.69 ↑ | 28.0 | 5.08 ↓ |
| ④ ke [vs/rad] | 0.05472 | 0.05473 | 0.02 ↑ | 0.05469 | 0.05 ↓ | 0.05441 | 0.57 ↓ |

FIG. 8

| VISCOSITY: 125mPa.s | | |
|---|---|---|
| | BEFORE FILLING | AFTER FILLING |
| Frequency1 (Hz) | 3106 | 3068 |
| AMPLITUDE (m/s²) | 5.92 | 2.72 |
| Frequency2 (Hz) | 3842 | 3628 |
| AMPLITUDE (m/s²) | 15.8 | 5.77 |

AMPLITUDE DECREASE IN SECTION OF 3000-4000 Hz
ABOUT 54% DECREASE EFFECT

FIG. 9

| VISCOSITY: 800mPa.s | | |
|---|---|---|
| | BEFORE FILLING | AFTER FILLING |
| Frequency1 (Hz) | 3127 | 2900 |
| AMPLITUDE (m/s²) | 5.5 | 2.7 |
| Frequency2 (Hz) | 3562 | 3595 |
| AMPLITUDE (m/s²) | 10.8 | 3.01 |

AMPLITUDE DECREASE IN SECTION OF 3000-4000 Hz
ABOUT 51% DECREASE EFFECT

MOTOR

CROSS-REFERENCE TO RELATED APPLICATIONS

This application is the U.S. national stage application of International Patent Application No. PCT/KR2019/010883, filed Aug. 27, 2019, which claims the benefit under 35 U.S.C. § 119 of Korean Patent Application No. 10-2018-0102692, filed Aug. 30, 2018, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, as more electric devices are used in a vehicle, demands for a motor applied to a steering system, a braking system, a machinery system, and the like are significantly increasing.

A motor may include a housing, a shaft, a stator disposed on an inner circumferential surface of the housing, a rotor disposed on an outer circumferential surface of the shaft, and the like. In this case, an electrical interaction is induced between the stator and the rotor so that the rotor rotates.

The rotor may include a rotor core and a plurality of magnets disposed on the rotor core. In the case of such a multi-pole motor, there is a problem in that loud noise and a great deal of vibration occur.

Although the stator may be over-molded to reduce the noise and vibration, there is a problem in that a production cost increases.

Accordingly, there is a need for a motor with a structure allowing production efficiency of the motor to be increased and the noise and vibration to also be reduced.

Technical Problem

The present invention is directed to providing a motor to which a robust design using an adhesive member such as glue is applied when sheets are stacked to form a stator core, thereby reducing noise and vibration.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed outside the rotor, wherein the stator includes a stator core formed by arranging a plurality of unit stator cores in a circumferential direction and a coil wound around the stator core, the unit stator core formed by stacking a plurality of sheets includes a yoke including a plurality of holes, a tooth protruding from the yoke in a radial direction, and an adhesive member disposed in the plurality of holes, and each of the plurality of holes is disposed on a virtual line (L) extending along one of both side surfaces of the tooth in the radial direction.

The line (L) may be parallel to a virtual line (L1) connecting a center (C) of the rotor and a center (C1) of the tooth.

The holes may be symmetrically disposed on the basis of the line (L1), and when viewed from above, a distance from the line (L1) to a center (C2) of the hole may be the same as a distance from the line (L1) to the side surface of the tooth.

Some amount of the adhesive member disposed in the plurality of holes may be disposed between the plurality of sheets. For example, when the adhesive member fills the holes, the adhesive member may penetrate between the sheets.

A diameter of each of the plurality of holes may be greater than two times and less than three times a thickness of each of the plurality of sheets. For example, when the thickness of the sheet in the shaft direction is 0.5 mm, a diameter of the hole may be greater than two times and less than three times the thickness.

A center (C2) of the hole may be disposed on the line (L).

The adhesive member may have an anaerobic property. In this case, a viscosity of the adhesive member may be greater than or equal to 125 mPa·s and less than 800 mPa·s.

The plurality of sheets forming at least one unit stator core among the plurality of unit stator cores may be formed by stacking a plurality of first sheets including the plurality of holes and a second sheet in which the hole is not formed.

The second sheet may be disposed on a lower surface of the first sheet disposed as a lowermost layer among the plurality of first sheets and may block the holes of the plurality of first sheets.

The holes may be symmetrically disposed on the basis of the virtual line (L1) connecting the center (C) of the rotor and the center (C1) of the tooth.

When viewed in the radial direction, the hole may be disposed to overlap the side surface of the tooth.

In addition, twelve teeth may be provided, and ten magnets of the rotor may be provided.

Advantageous Effects

According to embodiments, a motor to which a robust design is applied can be formed to reduce noise and vibration, wherein the robust design can be implemented by stacking sheets to form a stator core and filling holes formed in the stator core with an adhesive member.

Particularly, in the case of a multi-pole motor having ten poles and twelve slots, since louder noise and more vibration occur when compared to other motors, the noise and vibration of the motor can be reduced by filling the holes formed in the stator core with the adhesive member.

Although the robust design may be implemented by applying the adhesive member on the sheets and stacking the sheets, a cost and a time for a process increase. Accordingly, in the motor according to the embodiment, the adhesive member can penetrate between the sheets through the holes formed in the stator core to reduce the noise and vibration and also reduce a production cost.

In this case, the noise and vibration of the motor can be reduced further according to a viscosity of the adhesive member.

Various useful advantages and effects of the embodiments are not limited to the above-described contents and will be more easily understood from descriptions of the specific embodiments.

DESCRIPTION OF DRAWINGS

FIG. 8 is a table showing a reduction in vibration before and after filling with an adhesive member of the motor according to the embodiment when a viscosity of the adhesive member is 125 mPa·s.

FIG. 9 is a table showing a reduction in vibration before and after filling with an adhesive member of the motor according to the embodiment when the viscosity of the adhesive member is 800 mPa·s.

MODES OF THE INVENTION

Figure 1:
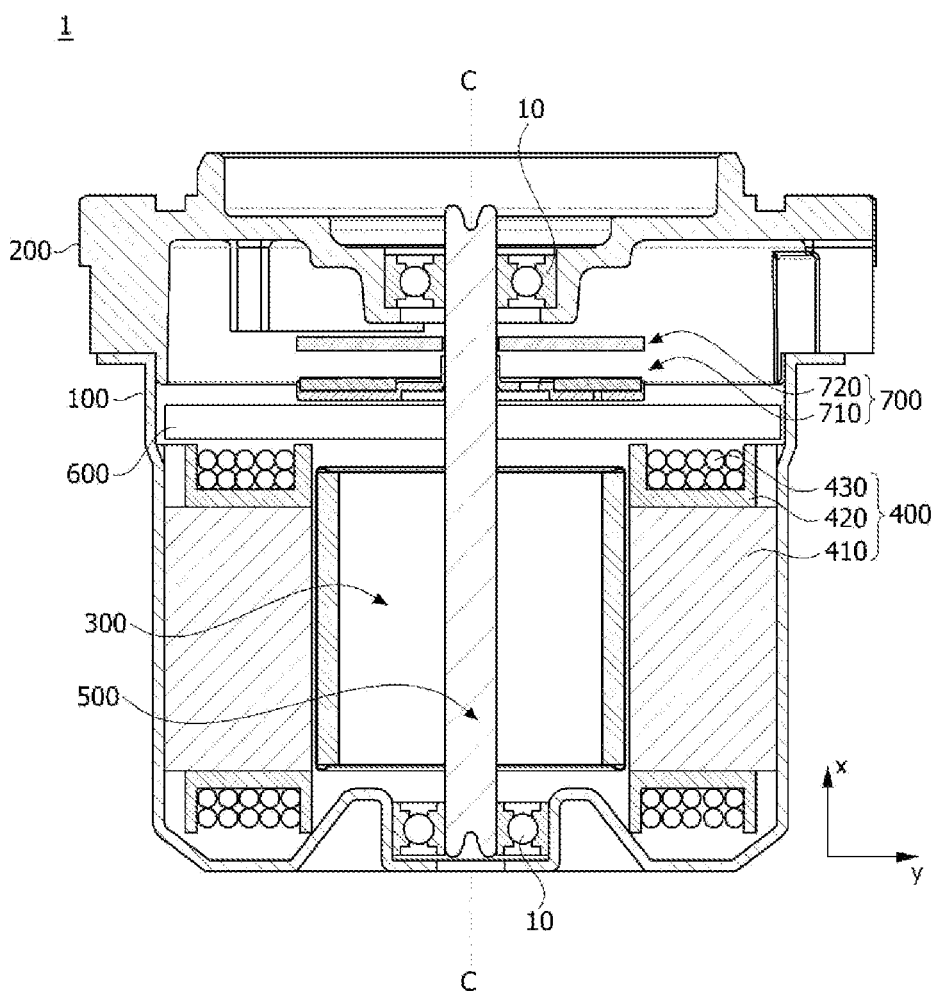
FIG. 1 is a view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
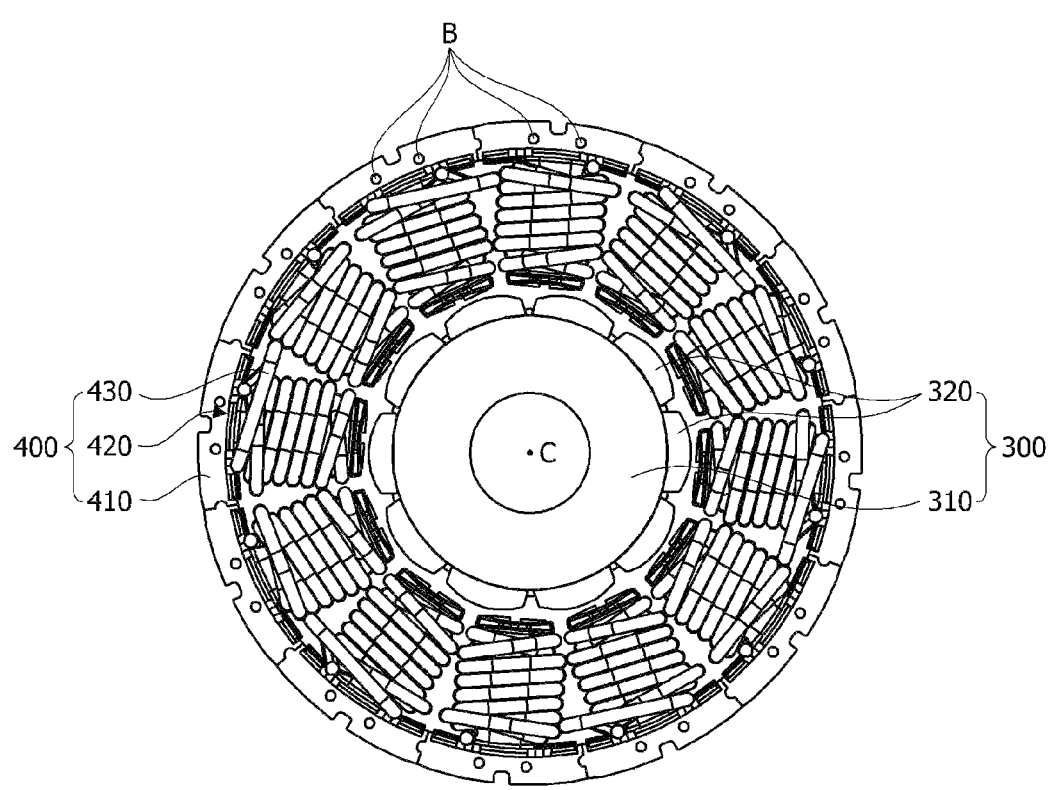
FIG. 2 is a view illustrating a rotor and a stator of the motor according to the embodiment.
Figure 3:
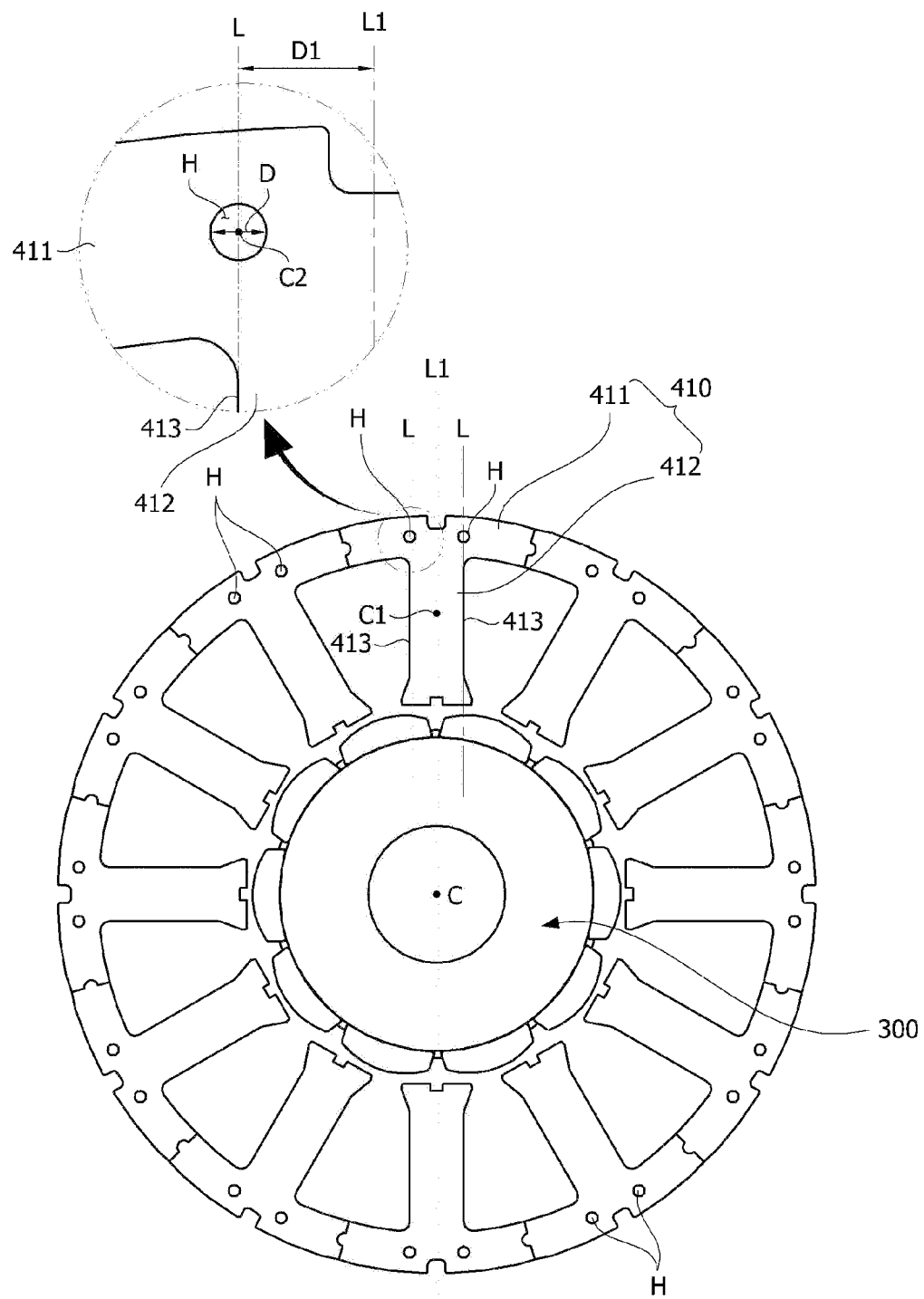
FIG. 3 is a view illustrating an arrangement relationship between the rotor and a stator core of the motor according to the embodiment.

FIG. 1 is a view illustrating a motor according to an embodiment, FIG. 2 is a view illustrating a rotor and a stator of the motor according to the embodiment, and FIG. 3 is a view illustrating an arrangement relationship between the rotor and a stator core of the motor according to the embodiment. In FIG. 1, an x direction may be referred to as a shaft direction and a y direction may be referred to as a radial direction. In addition, the shaft direction may be perpendicular to the radial direction. In this case, the stator core illustrated in FIG. 3 may be in a state before a hole is filled with an adhesive member.

Referring to FIGS. 1 and 2, a motor 1 according to the embodiment includes a housing 100 in which an opening is formed at one side, a cover 200 disposed on the housing 100, a rotor 300 coupled to a shaft 500, a stator 400 disposed in the housing 100, the shaft 500 configured to rotate with the rotor 300, a busbar 600 disposed on the stator 400, and a sensor part 700 configured to detect rotation of the rotor 300. In this case, the rotor 300 of the motor 1 may include ten magnets 320, and the stator 400 may include twelve teeth 412.

In this case, a stator core 410 of the stator 400 may be formed by stacking a plurality of sheets S in the shaft direction. In addition, an adhesive member B may penetrate between the sheets S by filling holes H formed in the stator core 410. Accordingly, in the motor 1, noise and vibration may be reduced due to the adhesive member B penetrating between the sheets S.

The motor 1 may be a motor used in an electronic power steering (EPS) system. The EPS system may assist a steering force using a driving force of the motor to secure turning stability and provide a rapid restoring force of a vehicle. Accordingly, a driver of the vehicle can travel safely.

The housing 100 and the cover 200 may form an exterior of the motor 1. In addition, the housing 100 may be coupled to the cover 200 to form an accommodation space. Accordingly, as illustrated in FIG. 1, the rotor 300, the stator 400, the shaft 500, the busbar 600, the sensor part 700, and the like may be disposed in the accommodation space. In this case, the shaft 500 is rotatably disposed in the accommodation space. Accordingly, the motor 1 may further include bearings 10 disposed on an upper portion and a lower portion of the shaft 500.

The housing 100 may be formed in a cylindrical shape. In addition, the rotor 300, the stator 400, and the like may be accommodated in the housing 100. In this case, the shape or material of the housing 100 may be variously changed. For example, the housing 100 may be formed of a metal material which firmly withstands even at high temperature.

The cover 200 may be disposed on an open surface of the housing 100, that is, an upper portion of the housing 100, to cover an opening of the housing 100.

Referring to FIGS. 1 to 3, the rotor 300 may be disposed inside the stator 400, and the shaft 500 may be coupled to a central portion of the rotor 300 through a press-fitting method. In this case, the term "inside" may be referred to as a direction toward a center C, and the term "outside" may be referred to as a direction opposite to the term "inside."

In addition, the rotor 300 may be rotatably disposed inside the stator 400.

Referring to FIGS. 2 and 3, the rotor 300 may include a rotor core 310 and a plurality of magnets 320 disposed on an outer circumferential surface of the rotor core 310 in a circumferential direction.

As illustrated in FIG. 3, ten magnets 320 may be disposed on the outer circumferential surface of the rotor core 310 to be spaced apart from each other at preset intervals. In this case, the magnets 320 may be referred to as rotor magnets or drive magnets. In this case, an example in which the plurality of magnets 320 are disposed on the outer circumferential surface of the rotor core 310 of the rotor 300 is illustrated, but the present invention is not necessarily limited thereto. For example, the rotor 300 may also be formed as an interior permanent magnet (IPM) rotor in which magnets 320 are disposed in a rotor core 310.

The rotor core 310 may be formed in a form in which a plurality of circular thin steel plates are stacked on each other or a single cylindrical form. In addition, a hole coupled to the shaft 500 may be formed at a center C of the rotor core 310.

The magnets 320 generate a rotating magnetic field with coils 430 wound around the stator core 410 of the stator 400. The magnets 320 may be disposed so that an N-pole and an S-pole are alternately disposed around the shaft 500 in the circumferential direction.

Accordingly, due to an electrical interaction between the coils 430 and the magnets 320, the rotor 300 is rotated, and the shaft 500 is rotated in conjunction with the rotation of the rotor 300 so that a driving force of the motor 1 is generated.

Meanwhile, the rotor 300 may further include a can (not shown) disposed to cover the rotor core 310 to which the magnets 320 are attached.

The can may protect the rotor core 310 and the magnets 320 from external shocks and physical and chemical stimuli while inhibiting foreign materials from being introduced to the rotor core 310 and magnets 320.

In addition, the can inhibits the magnets 320 from being separated from the rotor core 310.

The stator 400 may be disposed inside the housing 100. In this case, the stator 400 may be coupled to the housing 100 through a hot press fitting method. Accordingly, the stator 400 may be supported by an inner circumferential surface of the housing 100. In addition, the stator 400 is disposed outside the rotor 300. That is, the rotor 300 may be rotatably disposed inside the stator 400.

Referring to FIGS. 1 and 2, the stator 400 may include the stator core 410, insulators 420 disposed on the stator core 410, and the coils 430 wound around the insulators 420. In this case, the insulators 420 may be disposed between the stator core 410 and the coils 430 to insulate the coils 430.

The coils 430 configured to generate a rotating magnetic field may be wound around the stator core 410.

The stator core 410 may include yokes 411 in which holes H are formed, teeth 412 protruding from the yokes 411 in the radial direction, and the adhesive member B disposed in the holes H.

Figure 4:
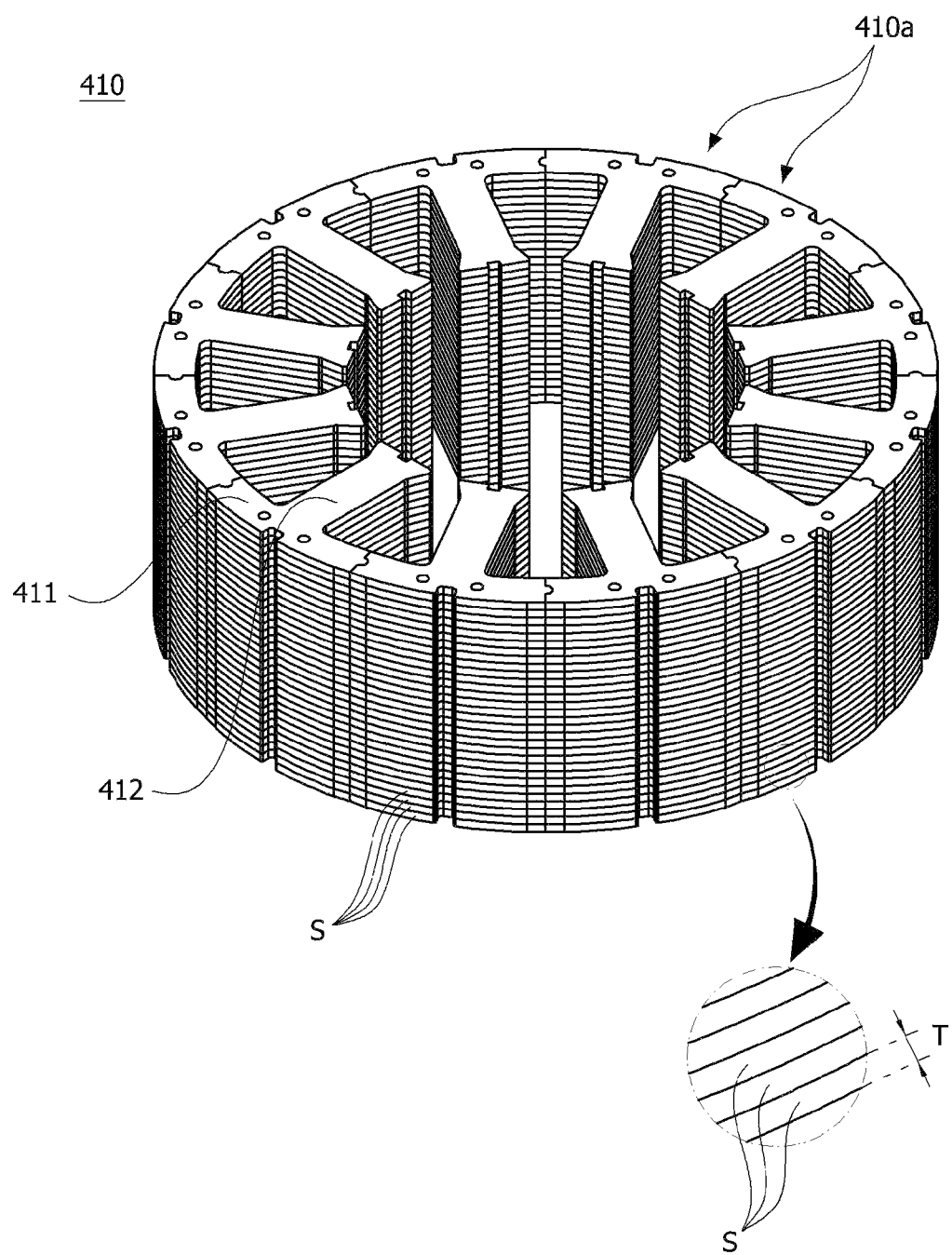
FIG. 4 is a perspective view illustrating the stator core of the motor according to the embodiment.

FIG. 4 is a perspective view illustrating the stator core of the motor according to the embodiment.

Referring to FIG. 4, the stator core 410 may be formed in a form in which a plurality of thin steel sheets S are stacked on each other. Accordingly, when the adhesive member B fills the holes H, the adhesive member B may penetrate between the sheets S to reduce noise and vibration of the motor 1. In this case, each of the plurality of sheets S may have a predetermined thickness T in the shaft direction. In this case, the thickness T may be 0.5 mm.

The yokes 411 may be formed in a cylindrical shape. In addition, the plurality of teeth 412 may be disposed to protrude from an inner circumferential surface of the yokes 411 in the radial direction. In this case, the teeth 412 may be disposed to be spaced apart from each other in the circumferential direction. Accordingly, slots may be formed between the teeth 412 for winding the coils 430.

In addition, the coil 430 may be wound around the tooth 412. In this case, the insulator 420 may be disposed between the tooth 412 and the coil 430 to insulate the tooth 412 from the coil 430.

The plurality of holes H may be disposed in the yokes 411 to be spaced apart from each other in the circumferential direction. In this case, the holes H may be formed in the yokes 411 to pass through the yokes 411 in the shaft direction but are not necessarily limited thereto.

Referring to FIG. 3, the holes H may be disposed on virtual lines L each extending along a corresponding side surface 413 of the teeth 412 in the radial direction. Accordingly, when viewed in the radial direction, the holes H may be disposed to overlap the side surfaces 413 of the teeth 412.

As illustrated in FIG. 3, since two side surfaces 413 of the tooth 412 are provided, two holes H may also be provided to correspond to the side surfaces 413 of the tooth 412.

In this case, a center C2 of the hole H may be disposed on the line L but is not necessarily limited thereto. For example, the hole H may also be disposed in the yoke 411 in a range in which an outer diameter of the hole H does not deviate the line L.

In this case, the line L may be parallel to a virtual line L1 connecting a center C of the rotor 300 and a center C1 of the tooth 412. Accordingly, the two holes H may be symmetrically disposed on the basis of the line L1, and a distance D1 from the line L1 to the center C2 of the hole may be the same as a distance from the line L1 to the side surface 413 of the tooth 412.

Meanwhile, a diameter D of the hole H may be greater than or equal to two times and less than three times the thickness T of the sheet S in the shaft direction. Accordingly, when the thickness T of the sheet S is 0.5 mm, the diameter D of the hole H may be in the range of φ1.0≤D<φ1.5.

In addition, since the holes H are filled with the adhesive member B, the adhesive member B may penetrate between the sheets S. For example, when the adhesive member B fills the holes H, the adhesive member B may penetrate between the sheets S stacked in the shaft direction due to the capillary phenomenon.

In this case, the adhesive member B filling the hole H may be glue having an anaerobic property. Accordingly, the adhesive member B may be cured without performing a curing process using thermal curing or ultraviolet curing. In addition, a viscosity of the adhesive member B may be 125 mPa·s or more and less than 800 mPa·s.

For example, in a case in which the viscosity of the adhesive member B is 125 mPa·s, the adhesive member B penetrates between the sheets S at high speed so that a section in which the adhesive member B is not applied is not present between the sheets S. That is, the adhesive member B may be applied between all the sheets S. However, in a case in which the viscosity of the adhesive member B is less than 125 mPa·s, the adhesive member B may be applied between the sheets S and leak to the outside.

In addition, in a case in which the viscosity of the adhesive member B is 800 mPa·s, although the adhesive member B penetrates between the sheets S, a section is formed in which the adhesive member B may not penetrate to an inner side of the tooth 412 through between the sheets S. In addition, the viscosity of the adhesive member B is 2000 mPa·s, since it takes a considerable amount of time for the adhesive member B to penetrate between the sheets S, workability is degraded, curing proceeds, and thus a section may be formed in which the adhesive member B does not penetrate between the sheets S, wherein the section may be half of an area of the sheet S.

Accordingly, the adhesive member B, which has a viscosity greater than or equal to 125 mPa·s and less than 800 mPa·s, of the motor 1 may be selected in consideration of penetration speed and the capillary phenomenon.

Figures 5, 6A:
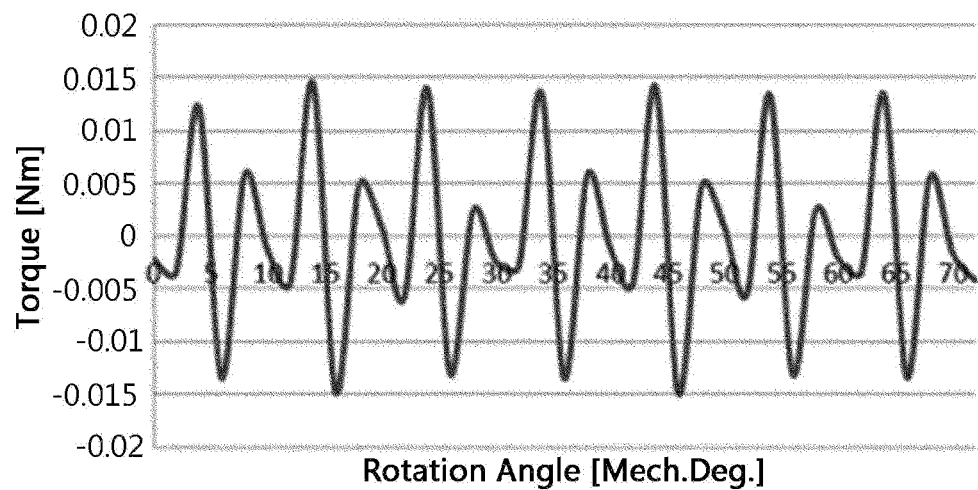
FIG. 5 is a performance comparison table according to a diameter of a hole formed in the stator core of the motor according to the embodiment.
FIG. 6A is a graph showing a cogging torque of a comparative example.

FIG. 5 is a table comparing electrical performance variations according to the diameter of the hole formed in the stator core of the motor according to the embodiment, FIGS. 6A to 6D are graphs showing a cogging torque of a comparative example and a cogging torque according to the diameter of the hole formed in the stator core of the motor according to the embodiment, and FIGS. 7A to 7D are graphs showing electrical performance variations according to the diameter of the hole formed in the stator core of the motor according to the embodiment.

Figure 6B:
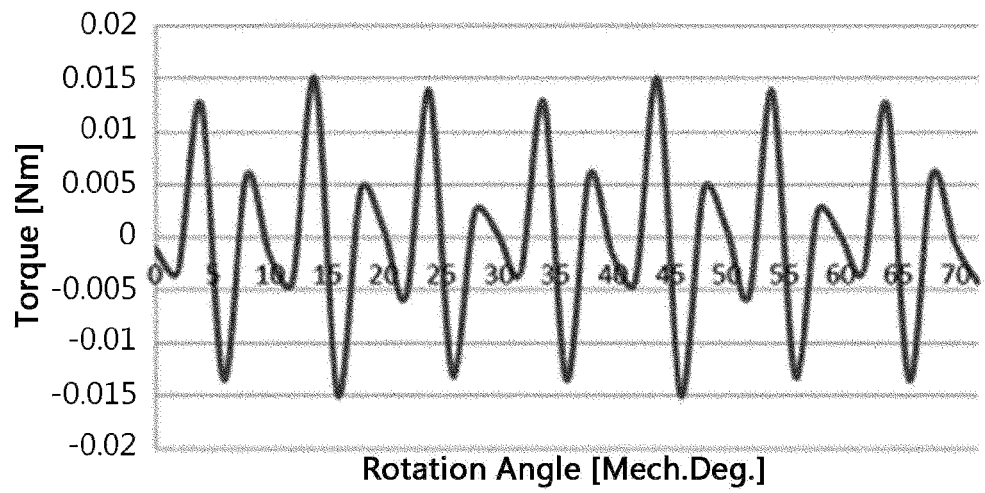
FIG. 6B is a graph showing a cogging torque in a case in which the diameter of the hole formed in the stator core of the motor according to the embodiment is φ1.0.
Figure 6C:
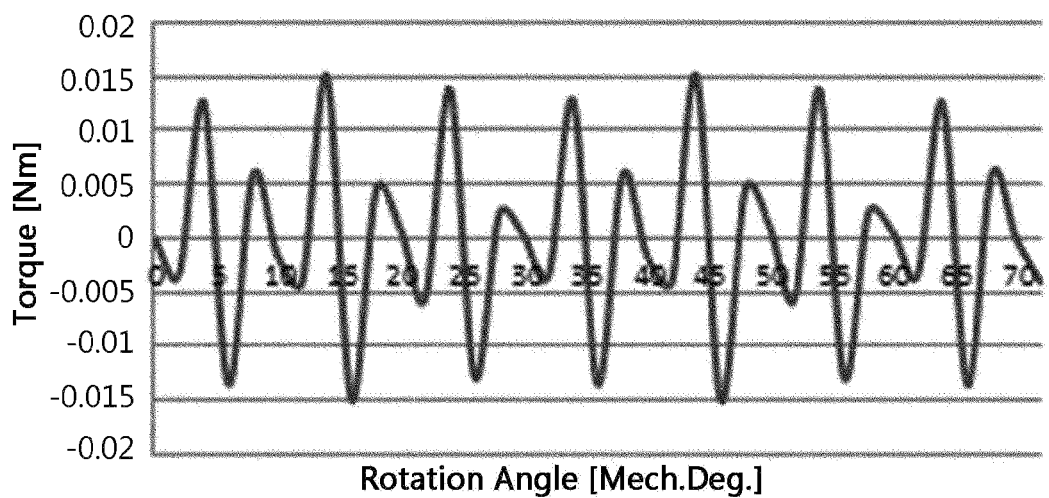
FIG. 6C is a graph showing a cogging torque in a case in which the diameter of the hole formed in the stator core of the motor according to the embodiment is φ1.5.
Figure 6D:
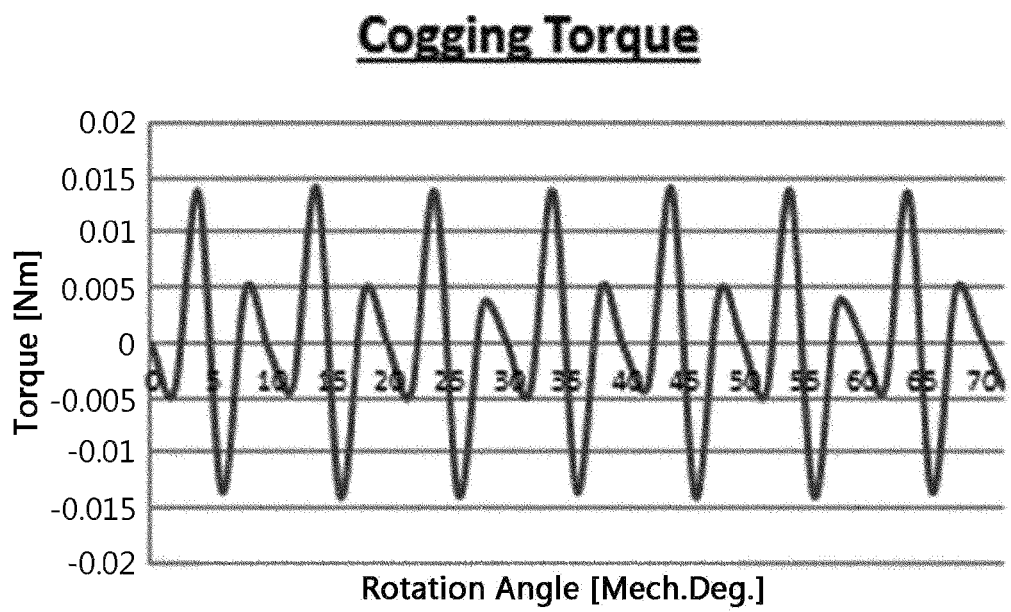
FIG. 6D is a graph showing a cogging torque in a case in which the diameter of the hole formed in the stator core of the motor according to the embodiment is φ2.0.

FIG. 6A is the graph showing the cogging torque of the comparative example, FIG. 6B is the graph showing the cogging torque in a case in which the diameter of the hole formed in the stator core is φ1.0, FIG. 6C is the graph showing the cogging torque in a case in which the diameter of the hole formed in the stator core is φ1.5, and FIG. 6D is the graph showing the cogging torque in a case in which the diameter of the hole formed in the stator core is φ2.0. In addition, FIG. 7A is a graph showing a torque according to the change in diameter of the hole, FIG. 7B is a graph showing a cogging torque according to the change in diameter, FIG. 7C is a graph showing a ripple according to the change in diameter of the hole, and FIG. 7D is a graph showing a counter electromotive force according to the change in diameter of the hole.

In this case, a motor provided as the comparative example is a motor in which a hole is not formed in a stator core. In this case, changes in electrical performance of experimented motors, each of which includes a rotor having ten magnets and a stator having twelve teeth, are compared, and the motor 1 is in a state in which the hole is not filled with the adhesive member.

Referring to FIGS. 5 and 6A to 6D, in a case in which the diameter D of the hole H is in the range of φ1.0≤D<φ1.5, it may be seen that changes in torque, cogging torque, ripple, and counter electromotive force of the motor 1 are insignificant.

Figure 7A:
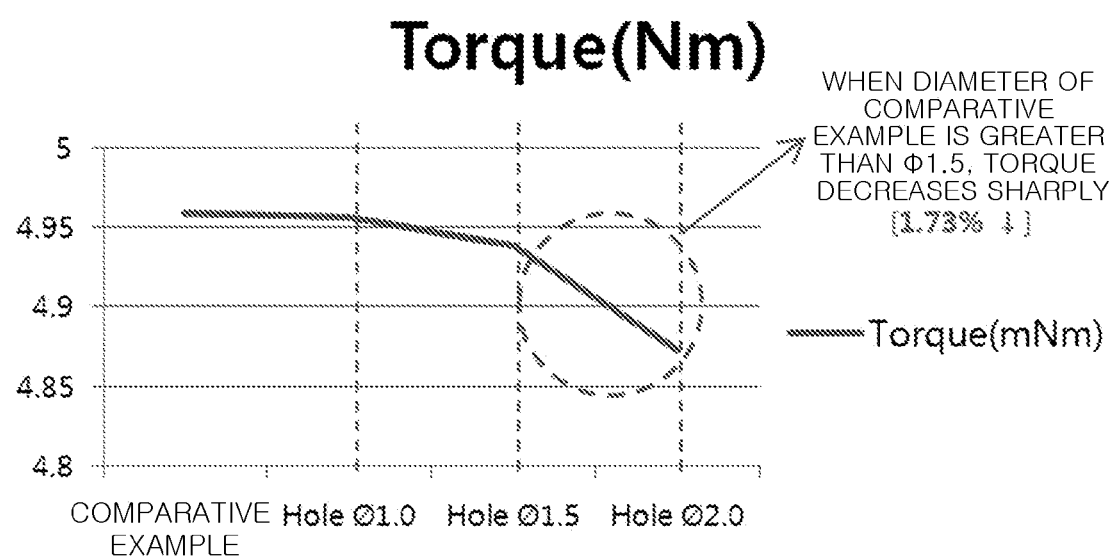
FIG. 7A is a graph showing a torque according to a change in diameter of the hole of the motor according to the embodiment.
Figure 7B:
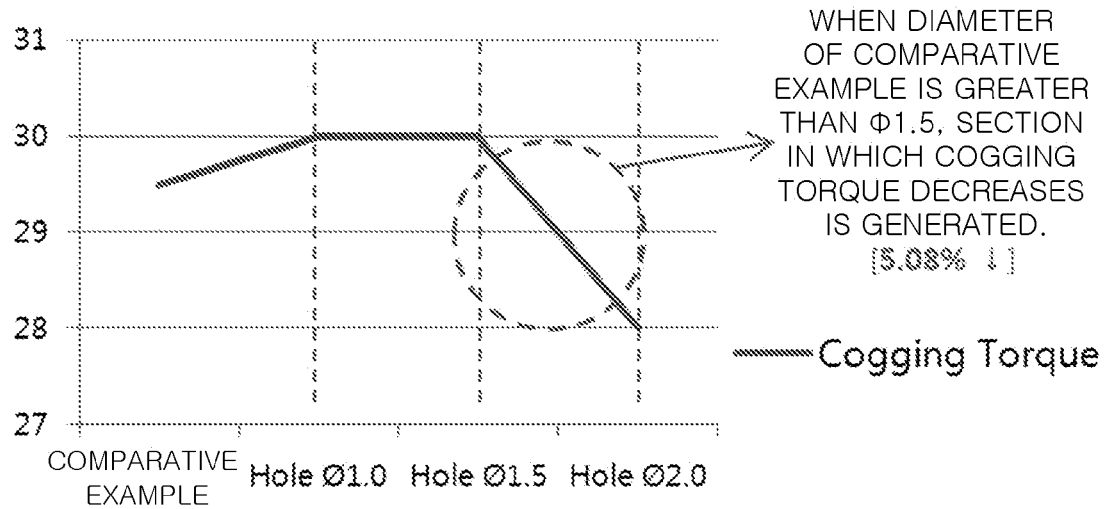
FIG. 7B is a graph showing a cogging torque according to the change in diameter of the hole of the motor according to the embodiment.
Figure 7C:
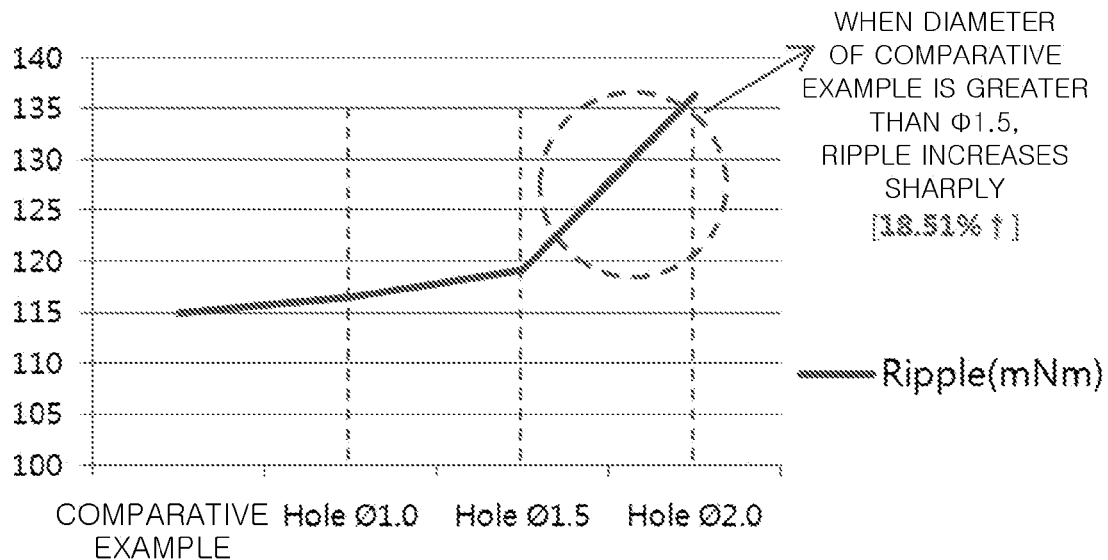
FIG. 7C is a graph showing a ripple according to the change in diameter of the hole of the motor according to the embodiment.
Figure 7D:
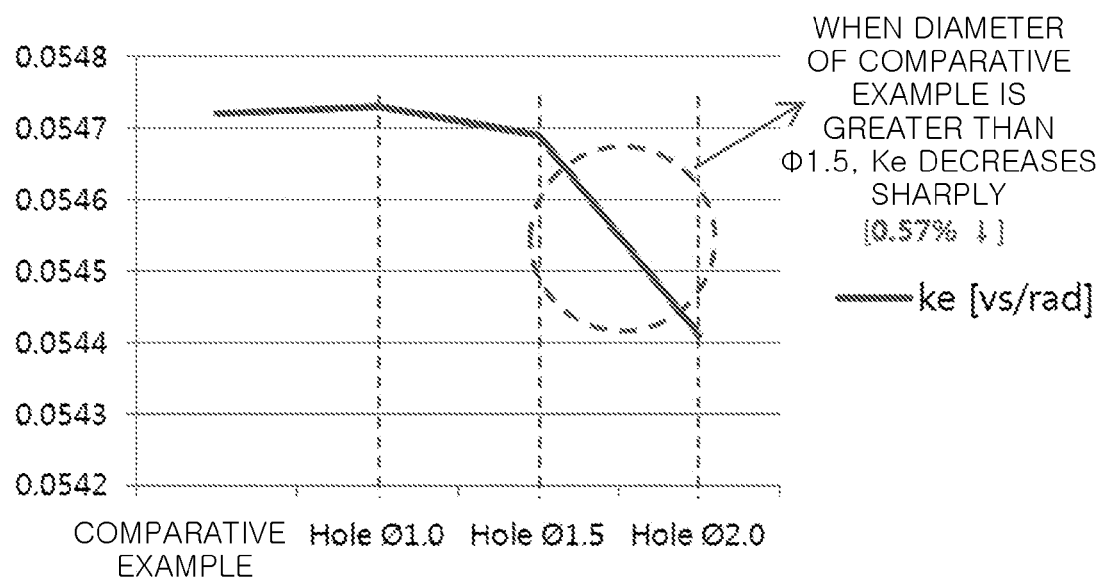
FIG. 7D is a graph showing a counter electromotive force according to the change in diameter of the hole of the motor according to the embodiment.

Referring to FIG. 7A, it may be seen that, when the diameter D of the hole H is in the range of φ1.0≤D<φ1.5, the torque is insignificantly decreased, but when the diameter D of the hole H is greater than φ1.5, a torque reduction rate increases.

Referring to FIG. 7B, it may be seen that, when the diameter D of the hole H is in the range of φ1.0≤D<φ1.5, the cogging torque increases insignificantly, but when the diameter D of the hole H is greater than φ1.5, the cogging torque decreases sharply. However, it may be seen that when the values are considered, since the cogging torque decreases from 30 mNm to 28 mNm, when the diameter D of hole H is greater than φ1.5, the cogging torque decreases slightly.

Referring to FIG. 7C, it may be seen that, when the diameter D of the hole H is in the range of φ1.0≤D<φ1.5, a ripple increases insignificantly, but when the diameter D of the hole H is greater than φ1.5, the ripple increases sharply.

Referring to FIG. 7D, it may be seen that when the diameter D of the hole H is in the range of φ1.0≤D<φ1.5, a counter electromotive force decreases insignificantly, but when the diameter D of the hole H is greater than φ1.5, the counter electromotive force decreases sharply.

FIG. 8 is a table showing a reduction in vibration before and after filling with an adhesive member of the motor according to the embodiment when a viscosity of the adhesive member is 125 mPa·s. FIG. 9 is a table showing a reduction in vibration before and after filling with an adhesive member of the motor according to the embodiment when the viscosity of the adhesive member is 800 mPa·s.

Referring to FIG. 8, it may be seen that when the viscosity of the adhesive member B filling the hole H is 125 mPa·s, an amplitude in a section between 3000 to 4000 Hz is decreased by about 54%.

Referring to FIG. 9, it may be seen that the viscosity of the adhesive member B filling the hole H is 800 mPa·s, the amplitude in the section between 3000 to 4000 Hz is decreased by about 51%.

Referring to FIG. 4, a plurality of unit stator cores 410a may be disposed in the circumferential direction to form the stator core 410. In this case, the unit stator core 410a including the holes H passing therethrough in the shaft direction may be referred to as a first unit stator core.

Figure 10:
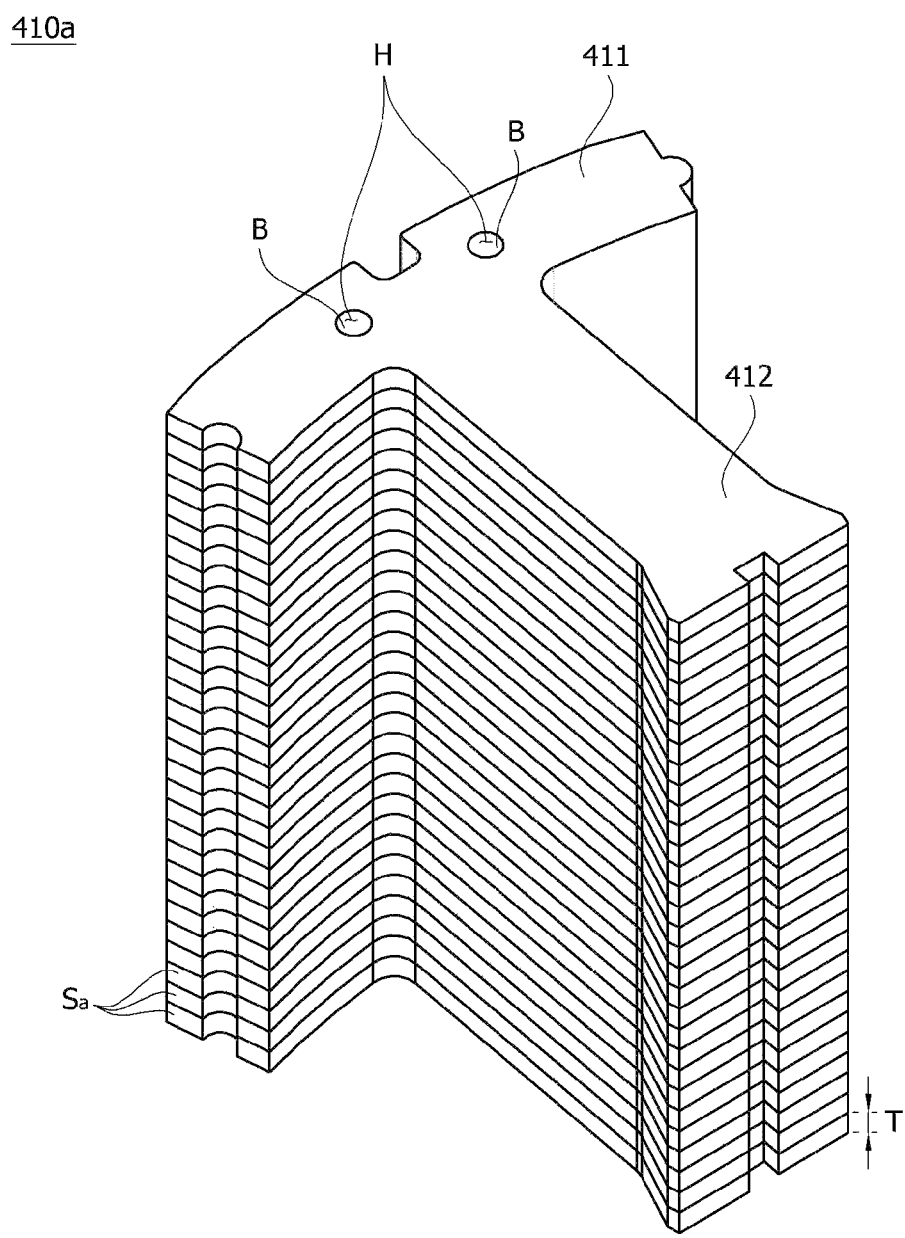
FIG. 10 is a perspective view illustrating a unit stator core of the motor according to the embodiment.
Figure 11:
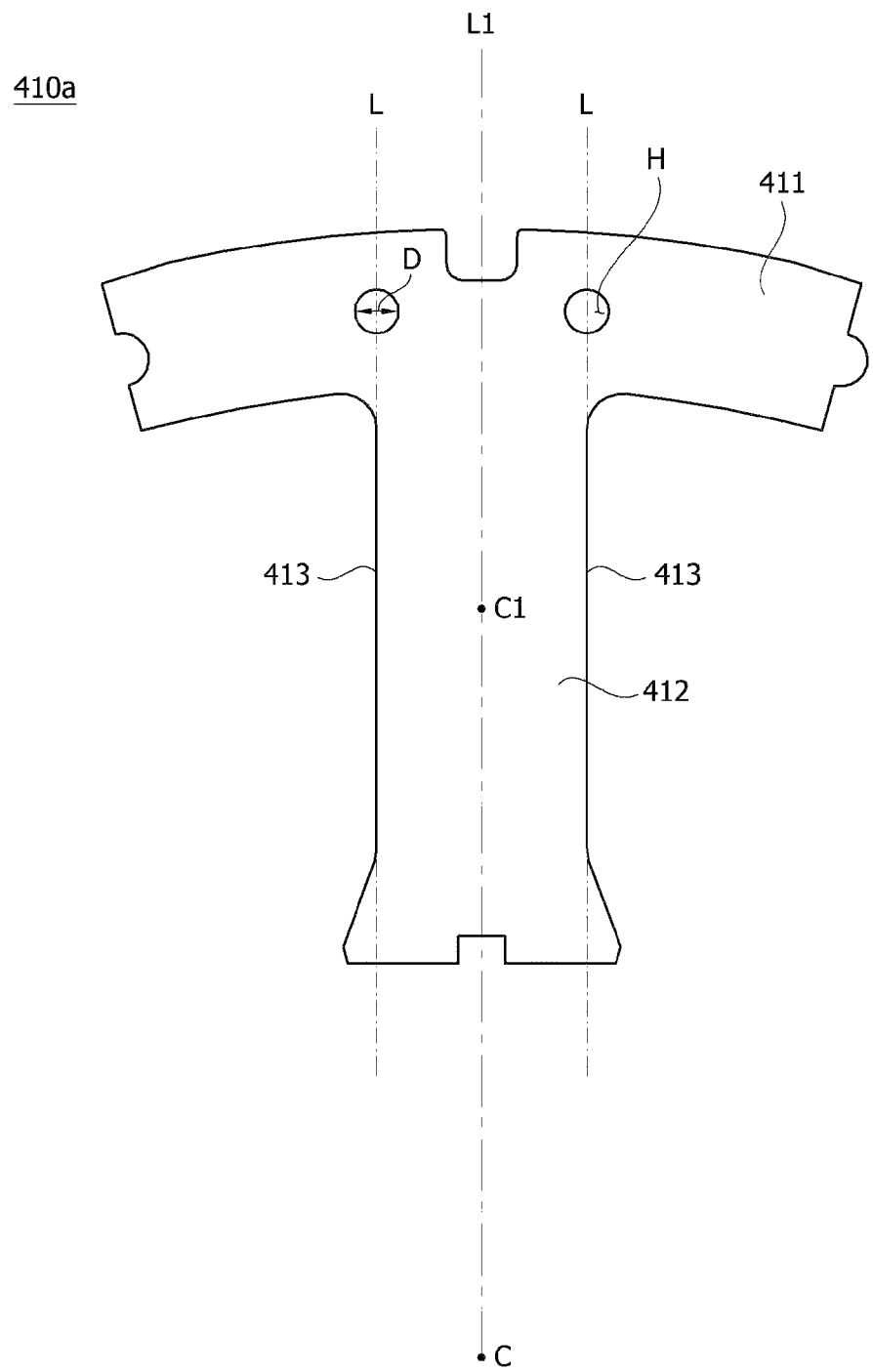
FIG. 11 is a plan view illustrating the unit stator core of the motor according to the embodiment.
Figure 12:
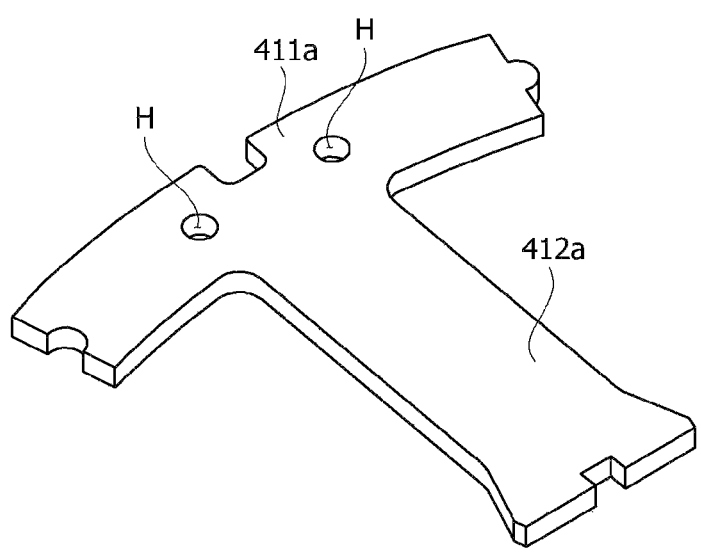
FIG. 12 is a perspective view illustrating a sheet of the unit stator core of the motor according to the embodiment.
Figure 13:
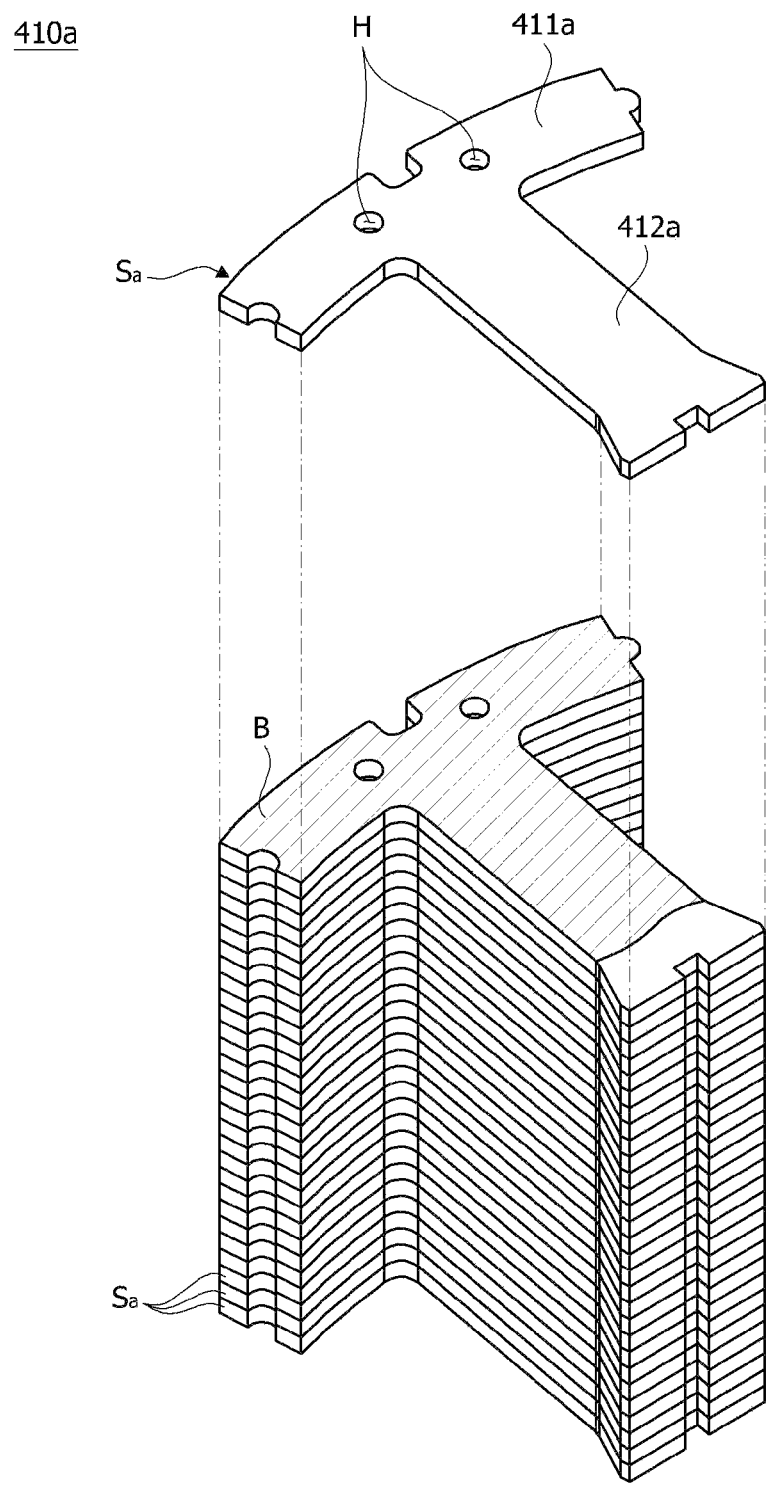
FIG. 13 is a view illustrating an adhesive member which permeates the unit stator core of the motor according to the embodiment.

FIG. 10 is a perspective view illustrating the unit stator core of the motor according to the embodiment, FIG. 11 is a plan view illustrating the unit stator core of the motor according to the embodiment, FIG. 12 is a perspective view illustrating a sheet of the unit stator core of the motor according to the embodiment, and FIG. 13 is a view illustrating the adhesive member which permeates the unit stator core of the motor according to the embodiment.

Referring to FIGS. 10 to 13, the unit stator core 410a may be formed by stacking sheets Sa including yokes 411a having an arc shape and teeth 412a protruding from the yokes 411a in the radial direction and filling the holes with the adhesive member B. As illustrated in FIG. 12, the holes H may be formed in the yoke 411a. In this case, the sheet Sa in which the holes H are formed to form the unit stator core 410a may be referred to as a first sheet.

Accordingly, as illustrated in FIG. 13, the adhesive member B may fill the holes H formed in the unit stator core 410a to penetrate between the sheets Sa. Accordingly, noise and vibration of the motor 1 may be reduced.

Figure 14:
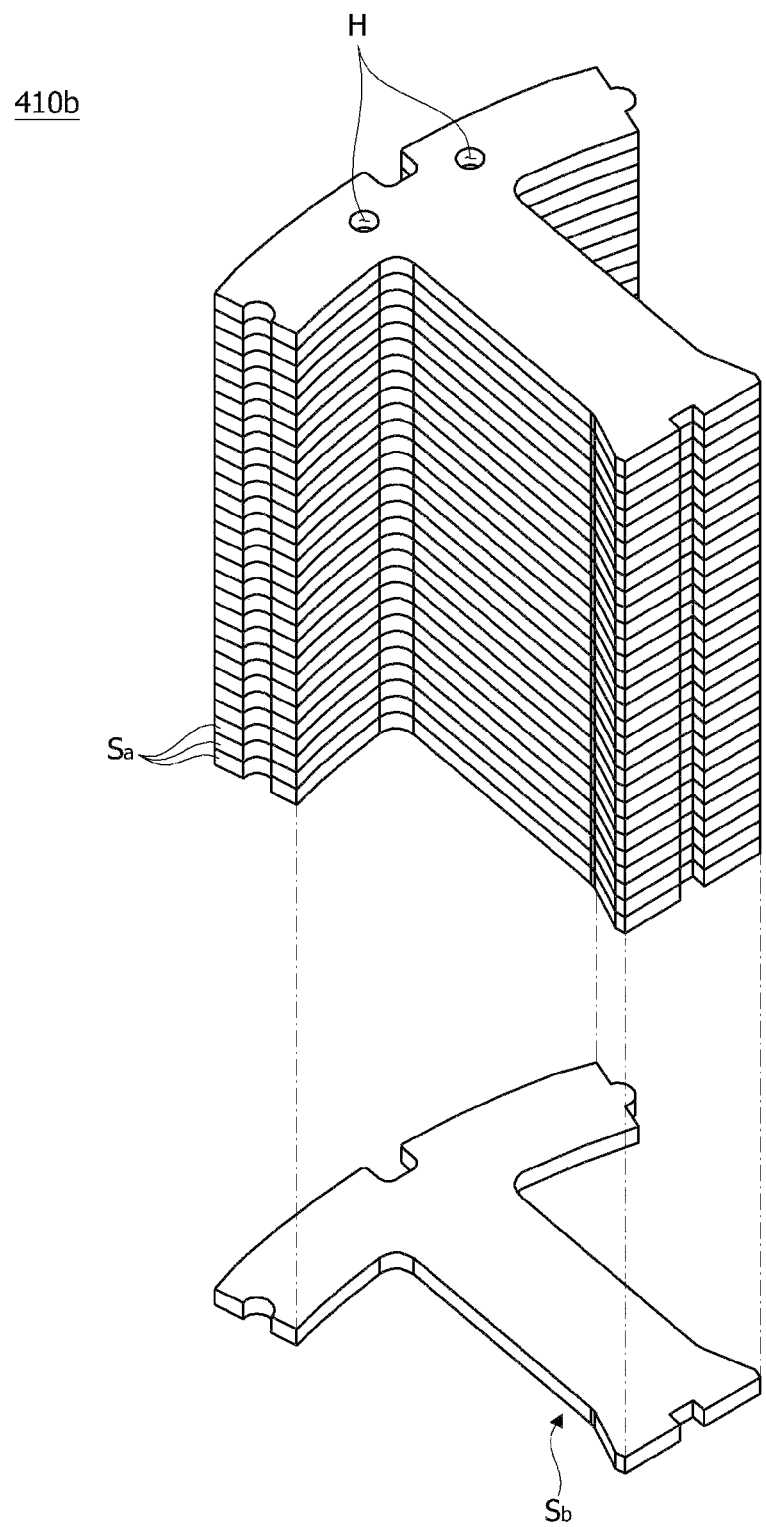
FIG. 14 is a perspective view illustrating another example of the unit stator core of the motor according to the embodiment.

FIG. 14 is a perspective view illustrating another example of the unit stator core of the motor according to the embodiment.

Referring to FIG. 14, a plurality of unit stator cores 410b may be disposed in the circumferential direction to form the stator core 410.

When the unit stator core 410b is compared to the first unit stator core which is the unit stator core 410a including the holes H passing therethrough in the shaft direction, there is a difference in that the unit stator core 410b, which is another example thereof, further includes a second sheet Sb which blocks the holes at a lower side of the unit stator core 410b. Accordingly, the unit stator core 410b which is another example thereof may be referred to as a second unit stator core.

Referring to FIG. 14, the unit stator core 410b, which is another example thereof, may include the plurality of first sheets Sa in which the holes H are formed and one second sheet Sb disposed below the first sheets Sa. In this case, the holes H are not present in the second sheet Sb. Accordingly, the second sheet Sb may block the holes H of the plurality of first sheets Sa, which are disposed to be stacked, to inhibit the adhesive member B from leaking to a lower side of the unit stator core 410b.

Figure 15:
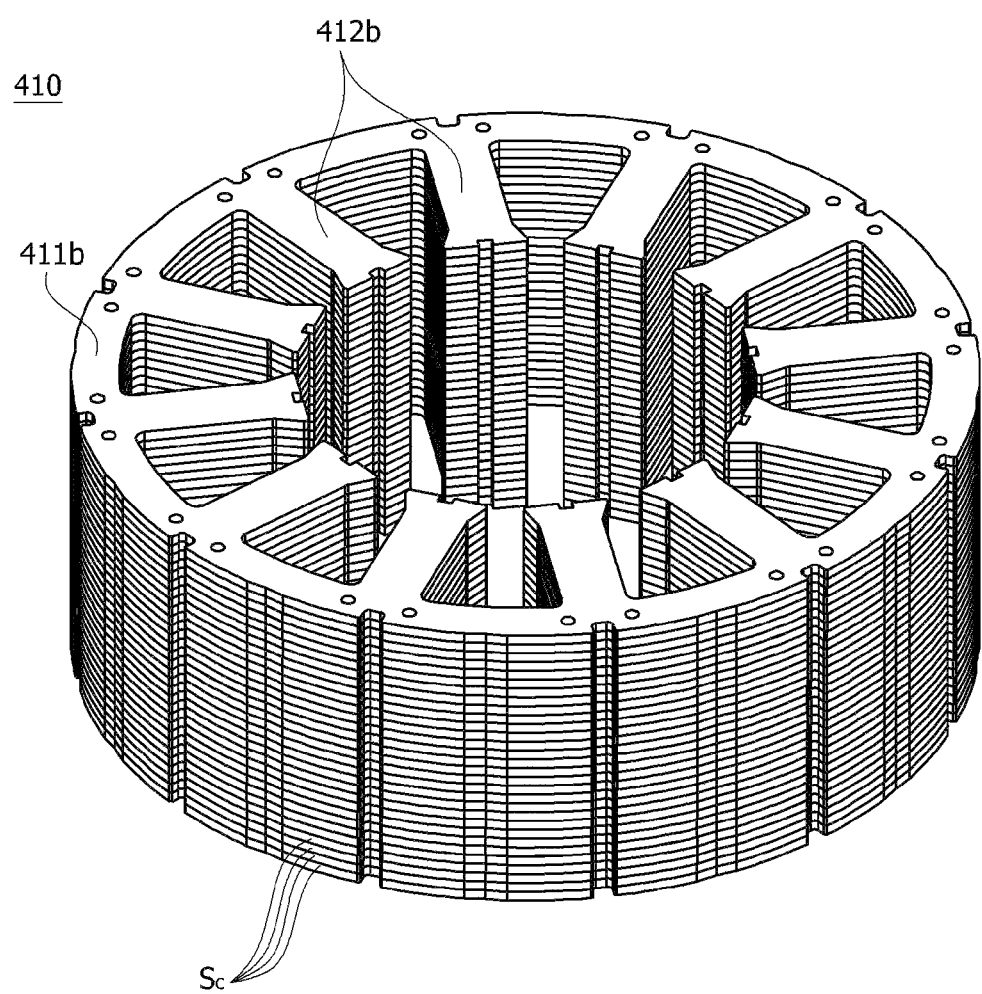
FIG. 15 is a view illustrating still another example of the stator core of the motor according to the embodiment.

FIG. 15 is a view illustrating still another example of the stator core of the motor according to the embodiment.

In the examples, the unit stator cores 410a or 410b are disposed in the circumferential direction to form the above-described stator core 410, but the present invention is not necessarily limited thereto.

As illustrated in FIG. 15, the stator core 410 may also be formed by stacking sheets Sc including a yoke 411b having a ring shape and a plurality of teeth 412b protruding from the yoke 411b in the radial direction. In this case, each of the plurality of sheets Sc may have a predetermined thickness T in the shaft direction. In this case, the thickness T may be 0.5 mm.

However, in the case in which the stator core 410 is formed using the unit stator cores 410a or 410b, since the adhesive member B may penetrate along contact surfaces between the unit stator cores 410a or 410b in the shaft direction according to the viscosity of adhesive member B, noise and vibration of the motor 1 may decrease further.

For example, when the adhesive member B fills the holes H in a state in which the plurality of unit stator cores 410a or 410b are disposed in the circumferential direction, and the plurality of unit stator cores 410a or 410b are temporarily assembled through a spot-welding method or the like, the adhesive member B may penetrate between the sheets Sa and permeate along contact surfaces between the unit stator cores 410a or 410b in the shaft direction.

Meanwhile, the tooth 412 may be disposed to face the magnet 320 of the rotor 300. In addition, the coil 430 is wound around each of the teeth 412.

The insulator 420 may be formed of a synthetic resin material to insulate the stator core 410 from the coil 430.

In addition, the coil 430 may be wound around the stator core 410 on which the insulator 420 is disposed. In addition, the coil 430 may generate a rotating magnetic field when power is supplied thereto.

The insulators 420 may be coupled to an upper side and a lower side of the stator core 410. In this case, the insulators 420 may also be formed as one single product to be coupled to the stator core 410. Alternatively, a plurality of unit insulators may also be formed as the insulators 420 so that the insulators 420 are disposed on the stator core 410 in the circumferential direction.

As illustrated in FIG. 1, the shaft 500 may be rotatably supported by the bearings 10 in the housing 100. In addition, the shaft 500 may be rotated in conjunction with the rotation of the rotor 300.

The busbar 600 may be disposed on the stator 400.

In addition, the busbar 600 may be electrically connected to the coil 430 of the stator 400.

The busbar 600 may include a busbar body and a plurality of terminals disposed in the busbar body. In this case, the busbar body may be a mold product formed through an injection molding process. In addition, each of the terminals may be electrically connected to the coil 430 of the stator 400.

The sensor part 700 may detect a magnetic force of a sensing magnet installed to rotate in conjunction with the rotor 300 to check a present position of the rotor 300 so as to detect rotation of the shaft 500.

The sensor part 700 may include a sensing magnet assembly 710 and a printed circuit board (PCB) 720.

The sensing magnet assembly 710 is coupled to the shaft 500 to rotate in conjunction with the rotor 300 so as to detect a position of the rotor 300. In this case, the sensing magnet assembly 710 may include sensing magnets and a sensing plate. The sensing magnets and the sensing plate may be coaxially coupled.

The sensing magnets may include main magnets disposed close to a hole forming an inner circumferential surface thereof in the circumferential direction and sub-magnets.

The main magnets may be arranged like the drive magnets inserted into the rotor 300 of the motor.

The sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes may be formed in the sensing plate.

A sensor configured to detect a magnetic force of the sensing magnets may be disposed on the PCB 720. In this case, a Hall integrated circuit (IC) may be provided as the sensor. In addition, the sensor may detect changes in an N-pole and an S-pole of the sensing magnet to generate a sensing signal.

While the present invention has been described with reference to the exemplary embodiments thereof, it will be understood by those skilled in the art that various changes in form and details may be made therein without departing from the spirit and scope of the invention as defined by the appended claims.

REFERENCE NUMERALS

| | |
|---|---|
| 1: | MOTOR |
| 100: | HOUSING |
| 200: | COVER |
| 300: | ROTOR |
| 310: | ROTOR CORE |
| 320: | MAGNET |
| 400: | STATOR |
| 410: | STATOR CORE |
| 430: | COIL |
| 500: | SHAFT |
| 600: | BUSBAR |
| 700: | SENSOR PART |

The invention claimed is:

1. A motor comprising:
a shaft;
a rotor coupled to the shaft; and
a stator disposed outside the rotor,
wherein the stator includes a stator core formed by arranging a plurality of unit stator cores in a circumferential direction and a coil wound around the stator core,
wherein each unit stator core is formed by stacking a plurality of sheets and includes a yoke including a plurality of holes, a tooth protruding from the yoke in a radial direction, and an adhesive member disposed in the plurality of holes,
wherein each of the plurality of holes is disposed on a virtual line (L) extending along one of both side surfaces of the tooth in the radial direction, and
wherein a diameter of each of the plurality of holes is greater than two times and less than three times a thickness of each of the plurality of sheets.

2. The motor of claim 1, wherein the line (L) is parallel to a virtual line (L1) connecting a center (C) of the rotor and a center (C1) of the tooth.

3. The motor of claim 2, wherein:
the plurality of holes are symmetrically disposed on the basis of the line (L1); and
when viewed from above, a distance from the line (L1) to a center (C2) of each hole is the same as a distance from the line (L1) to the side surface of the tooth.

4. The motor of claim 1, wherein some amount of the adhesive member disposed in the plurality of holes is disposed between the plurality of sheets.

5. The motor of claim 1, wherein the thickness of each of the plurality of sheets is 0.5 mm.

6. The motor of claim 1, wherein a viscosity of the adhesive member is greater than or equal to 125 mPa·s and less than 800 mPa·s.

7. The motor of claim 1, wherein a center of the hole is disposed on the virtual line (L).

8. The motor of claim 1, wherein:
the number of the teeth is twelve; and
the number of magnets of the rotor is ten.

9. The motor of claim 1, wherein inner end portions of the plurality of teeth are disposed to be spaced apart from each other in the circumferential direction.

10. A motor comprising:
a shaft;
a rotor coupled to the shaft; and
a stator disposed outside the rotor,
wherein the stator includes a stator core formed by arranging a plurality of unit stator cores in a circumferential direction and a coil wound around the stator core,
wherein each unit stator core is formed by stacking a plurality of sheets and includes a yoke including a plurality of holes, a tooth protruding from the yoke in a radial direction, and an adhesive member disposed in the plurality of holes, and
wherein the plurality of sheets forming at least one unit stator core among the plurality of unit stator cores are formed by stacking a plurality of first sheets including the plurality of holes and a second sheet in which holes are not formed.

11. The motor of claim 10, wherein the second sheet is disposed on a lower surface of the first sheet disposed as a lowermost layer among the plurality of first sheets and blocks the holes of the plurality of first sheets.

12. The motor of claim 10, wherein the first sheet includes:
a yoke having an arc shape;
a tooth protruding from the yoke in the radial direction; and
a plurality of holes formed in the yoke to pass through the yoke in a shaft direction.

13. A motor comprising:
a shaft;
a rotor coupled to the shaft; and
a stator disposed outside the rotor,
wherein the stator includes a stator core formed by arranging a plurality of unit stator cores in a circumferential direction and a coil wound around the stator core,
wherein each unit stator core is formed by stacking a plurality of sheets and includes a yoke including a plurality of holes, a tooth protruding from the yoke in a radial direction, and an adhesive member disposed in the plurality of holes, and
wherein, when the hole is filled with the adhesive member in a state in which the plurality of unit stator cores are disposed in the circumferential direction, the adhesive member permeates along a contact surface between the unit stator cores in a shaft direction.

* * * * *